US005775727A

United States Patent [19]
Sun et al.

[11] Patent Number: 5,775,727
[45] Date of Patent: Jul. 7, 1998

[54] DEPLOYMENT DOOR ASSEMBLY

[75] Inventors: Xingyuan Sun, Rochester Hills; Scott A. Kelley, Algonac; Andrew J. Smydra, Rochester, all of Mich.

[73] Assignee: TRW Vehicle Safety Systems Inc., Lyndhurst, Ohio

[21] Appl. No.: 588,075

[22] Filed: Jan. 17, 1996

[51] Int. Cl.⁶ ................................................. B60R 21/16
[52] U.S. Cl. ............................... 280/728.3; 280/732
[58] Field of Search ......................... 280/728.3, 731, 280/728.1, 732

[56] References Cited

U.S. PATENT DOCUMENTS

| | | |
|---|---|---|
| 5,125,683 | 6/1992 | Nakajima. |
| 5,344,183 | 9/1994 | Hersman et al.. |
| 5,368,327 | 11/1994 | Shiraki et al.. |
| 5,382,047 | 1/1995 | Gajewski .................... 280/728.3 |
| 5,393,089 | 2/1995 | Pakulsky et al.. |
| 5,498,027 | 3/1996 | Kelley et al. ................... 280/732 |
| 5,590,901 | 1/1997 | MacGregor .................. 280/728.3 |
| 5,626,357 | 5/1997 | Leonard et al. ................ 280/732 |

*Primary Examiner*—Eric D. Culbreth
*Attorney, Agent, or Firm*—Tarolli, Sundheim, Covell, Tummino & Szabo

[57] ABSTRACT

A deployment door assembly for use with an inflatable vehicle occupant protection device, such as an air bag (14), includes a panel (40) for covering the air bag (14) in a vehicle. The panel (40) has layers including a scrim layer (68). The scrim layer (68) has an edge (98) defining a boundary (110) between first and second portions (42,44) of the panel (40) which have first and second shear strengths, respectively. The scrim layer (68) imparts a difference between the first and second shear strengths such that the panel (40) is rupturable along the boundary (110) under the influence of the air bag (14) as a result of the difference in shear strengths.

7 Claims, 4 Drawing Sheets

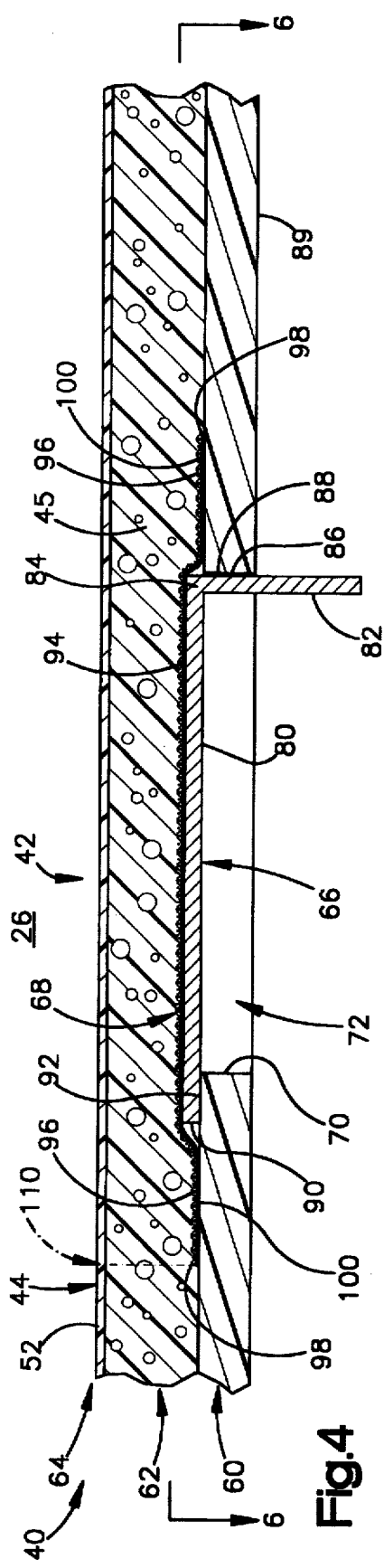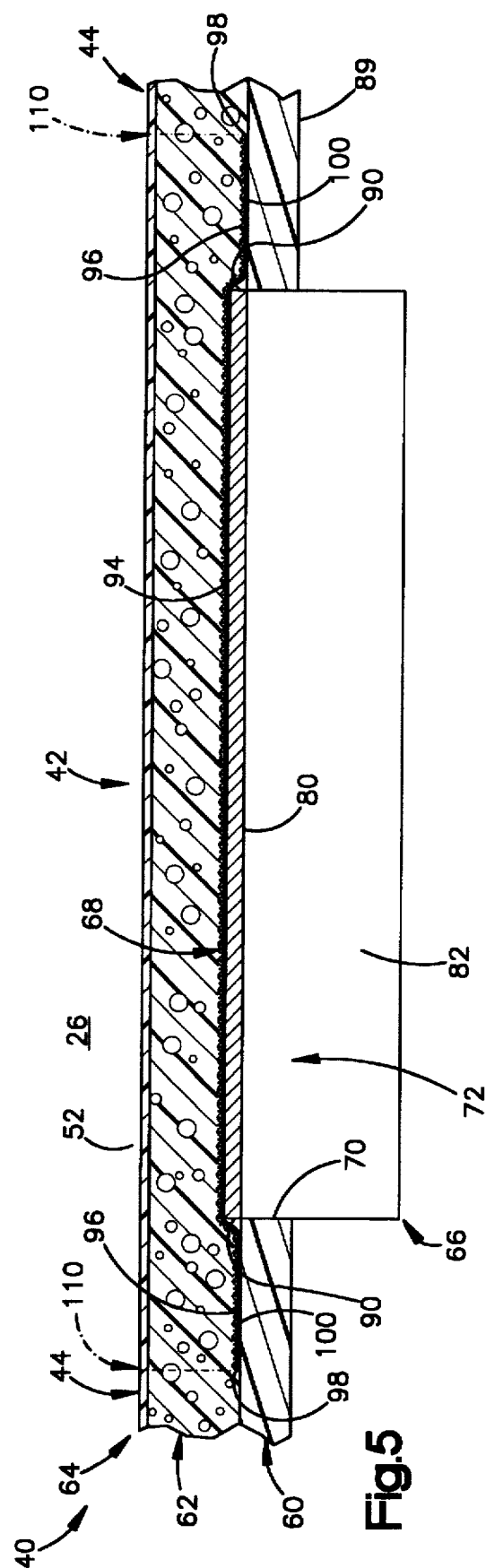

DEPLOYMENT DOOR ASSEMBLY

FIELD OF THE INVENTION

The present invention relates to a deployment door which is opened upon inflation of an inflatable vehicle occupant protection device.

BACKGROUND OF THE INVENTION

An inflatable vehicle occupant protection device, such as an air bag, is inflated to help protect an occupant of a vehicle upon the occurrence of a vehicle collision. When the vehicle experiences a collision of at least a predetermined threshold level of severity, an inflator emits inflation fluid which is directed to flow into the air bag. The inflation fluid inflates the air bag to an inflated condition in which the air bag extends into the vehicle occupant compartment. When the air bag is inflated into the vehicle occupant compartment, it helps to protect the occupant of the vehicle from a forceful impact with parts of the vehicle as a result of the collision.

The air bag is normally concealed from the vehicle occupant compartment by a trim structure. The trim structure may comprise a cover for a driver's side air bag on a vehicle steering column. The trim structure may alternatively comprise a deployment panel for a passenger side air bag in a vehicle instrument panel. Other trim structures also are known for covering air bags at other locations in a vehicle. In each case, the trim structure typically includes a pivotal deployment door, a rupturable closure structure, and a hinge. When the inflation fluid begins to flow into the air bag, it moves the air bag forcefully against the deployment door. The closure structure is then ruptured by the air bag. As the air bag continues to move against the deployment door, it forcefully deflects the hinge so as to move the deployment door pivotally open. The deployment door is thus opened and moved out of the path of the air bag as the air bag is inflated into the vehicle occupant compartment.

SUMMARY OF THE INVENTION

In accordance with the present invention, an apparatus for use with an inflatable vehicle occupant protection device, such as an air bag, comprises trim means for covering the inflatable device in a vehicle. The trim means has layers including a scrim layer. The scrim layer has an edge defining a boundary between first and second portions of the trim means which have first and second shear strengths, respectively. The scrim layer imparts a difference between the first and second shear strengths such that the trim means is rupturable along the boundary under the influence of the inflatable device as a result of the difference in shear strengths.

In a preferred embodiment of the present invention, the trim means is a deployment panel for covering an air bag which is mounted in a vehicle instrument panel. A substrate layer of the deployment panel defines a deployment opening through which the air bag moves when being inflated. The first portion of the deployment panel comprises a pivotal deployment door which extends across the deployment opening. The second portion of the deployment panel is a peripheral frame portion which surrounds the deployment door. Another part of the deployment panel defines a bendable hinge which extends along one side of the deployment door.

In the preferred embodiment, the edge of the scrim layer extends around three sides of the deployment door between opposite ends of the hinge. Accordingly, the rupturable boundary defined by the edge of the scrim layer is a boundary between the deployment door and the surrounding frame portion of the deployment panel. The peripheral shape of the deployment door is thus defined by the peripheral shape of the scrim layer. This enables the deployment door to have any peripheral shape that is suitable for the particular instrument panel, or other vehicle part, in which the air bag is mounted in the vehicle, because the peripheral shape of the scrim layer is not limited by the shape of the deployment opening or other parts of the apparatus.

BRIEF DESCRIPTION OF THE DRAWINGS

Further features of the present invention will become apparent to those skilled in the art to which the present invention relates from reading the following description with reference to the accompanying drawings, in which:

FIG. 4 is a view taken on line 4—4 of FIG. 3;

FIG. 5 is a view taken on line 5—5 of FIG. 3;

DESCRIPTION OF A PREFERRED EMBODIMENT

Figure 1:
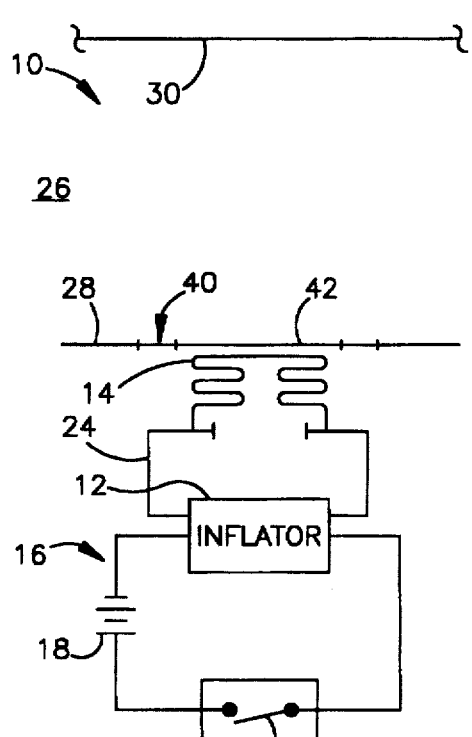
FIG. 1 is a schematic view of a vehicle occupant safety apparatus comprising a preferred embodiment of the present invention.
Figure 2:
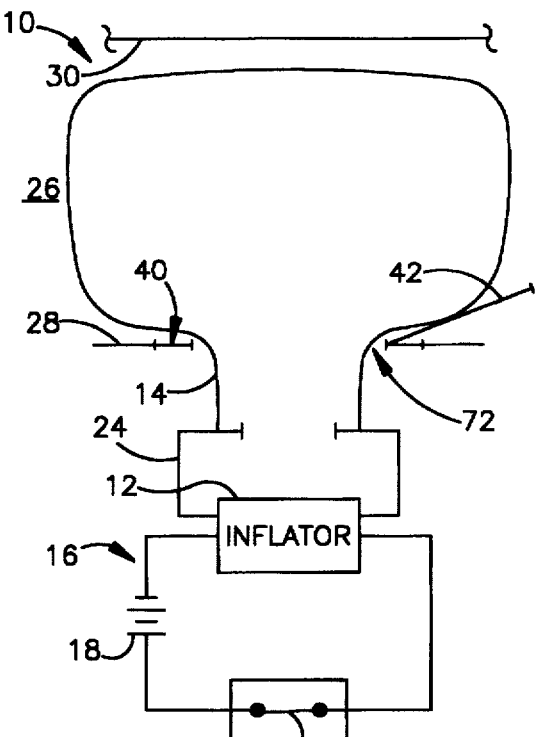
FIG. 2 is a view similar to FIG. 1 showing the apparatus in an actuated condition.

A vehicle occupant protection apparatus 10 comprising a preferred embodiment of the present invention is shown schematically in FIGS. 1 and 2. The apparatus 10 includes an inflator 12 and a particular type of inflatable vehicle occupant protection device 14 which is known as an air bag. The air bag 14 is inflatable from a folded, uninflated condition, as shown in FIG. 1, to an unfolded, fully inflated condition, as shown in FIG. 2.

The inflator 12 comprises a source of inflation fluid for inflating the air bag 14. As known in the art, the inflator 12 may contain an ignitable gas generating material for generating a large volume of inflation gas. The inflator 12 may alternatively contain a stored quantity of pressurized inflation fluid, or a combination of pressurized inflation fluid and ignitable material for heating the inflation fluid.

As shown schematically in FIG. 1, the inflator 12 is included in an electrical circuit 16 with a power source 18 and a normally open switch 20. The power source 18 is preferably the vehicle battery and/or a capacitor. The switch 20 is part of a sensor 22 which senses a condition indicating the occurrence of a vehicle collision. Such a condition may comprise, for example, sudden vehicle deceleration caused by a collision. If the collision-indicating condition is above a predetermined threshold level, it indicates the occurrence of a collision having at least a predetermined threshold level of severity. The predetermined threshold level of collision severity is a level for which inflation of the air bag 14 is desired to help protect an occupant of the vehicle. The switch 20 then closes, and electric current is directed through the inflator 12 to actuate the inflator 12. As a result, the inflator 12 rapidly emits a large volume of inflation fluid which flows into the air bag 14 to inflate the air bag 14.

As further shown schematically in FIGS. 1 and 2, the air bag 14 and the inflator 12 are mounted on a supporting structure 24. The supporting structure 24 could be a reaction canister, a reaction plate, a manifold, or the like, and is mounted in the vehicle adjacent to the vehicle occupant compartment 26. In the preferred embodiment of the present invention, the supporting structure 24 is mounted on the vehicle instrument panel 28 at a location opposite a seat 30 in the occupant compartment 26. When the air bag 14 is inflated, it helps to protect an occupant of the seat 30 from forcefully striking, or being struck by, the instrument panel 28 as a result of the collision.

A trim structure 40 covers the air bag 14 so as to conceal the air bag 14 from view in the occupant compartment 26. In the preferred embodiment of the present invention shown in the drawings, the trim structure 40 is a deployment panel which continues the contour and the trim theme of the instrument panel 28 across the location of the air bag 14. The deployment panel 40 includes a pivotal deployment door 42 which is opened by the air bag 14 as the air bag 14 inflates from the condition of FIG. 1 toward the condition of FIG. 2.

Figure 3:
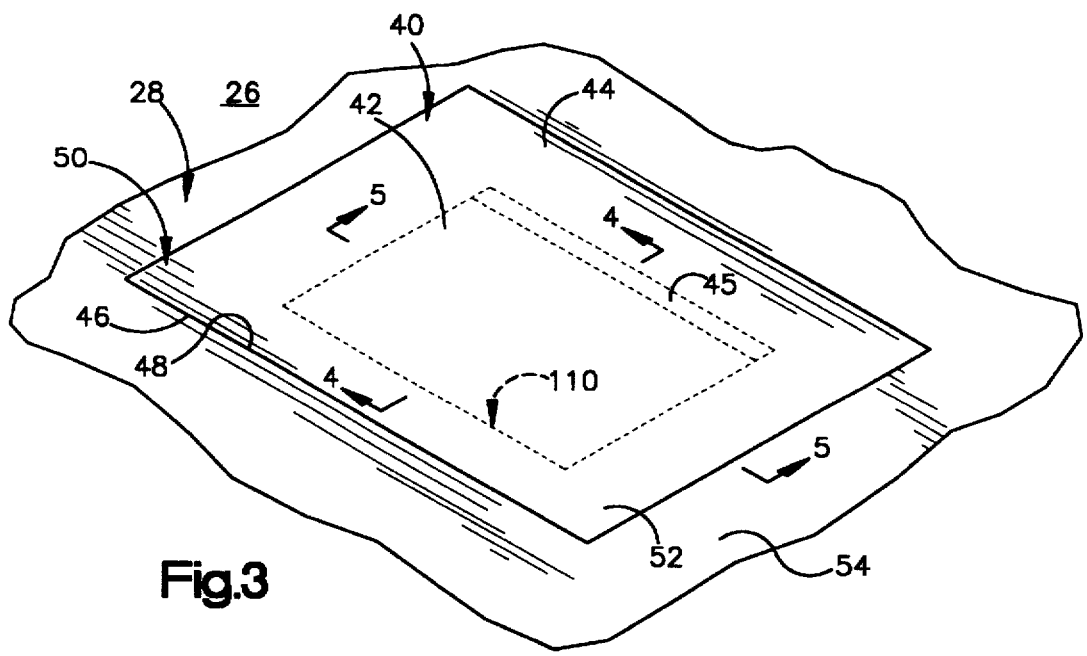
FIG. 3 is a perspective view of parts shown in FIG. 1.

As shown in greater detail in FIG. 3, the deployment door 42 is surrounded by a peripheral frame portion 44 of the deployment panel 40. A generally distinct hinge portion 45 of the deployment panel 40 extends along one side of the deployment door 42. Although the deployment door 42 and the surrounding frame portion 44 of the deployment panel 40 are shown to have rectangular peripheral shapes, each of those structures can alternatively have any other peripheral shape that is suitable for an alternative instrument panel upon which the deployment panel 40 may be mounted in a vehicle. This feature of the present invention is described more fully below.

A peripheral edge surface 46 of the deployment panel 40 extends alongside a surrounding inner edge surface 48 of the instrument panel 28. The deployment panel 40 thus extends fully across an opening 50 defined by the inner edge surface 48 of the instrument panel 28. An outer side surface 52 of the deployment panel 40 preferably matches the surface texture, color, and contour of a surrounding outer side surface 54 of the instrument panel 28. In this manner, the deployment panel 40 continues the contour and the trim theme of the instrument panel 28 across the opening 50, as noted above. Additionally, the outer side surface 52 is preferably unaffected by the structure of the deployment door 42 so that the outline of the deployment door 42 is not visible at the outer side surface 52.

The deployment panel 40 is a unitary structure with several interconnected parts. As shown in the sectional view of FIG. 4, the interconnected parts of the deployment panel 40 include a plastic substrate layer 60, a plastic intermediate layer 62, and a plastic cover layer 64. The interconnected parts of the deployment panel 40 further include a door foundation 66 and a scrim layer 68.

The substrate layer 60 is a continuous piece of molded plastic material with a substantially incompressible structure. The plastic material of which the substrate layer 60 is formed may have any suitable composition known in the art. An inner edge surface 70 of the substrate layer 60 defines a rectangular deployment opening 72 which extends fully through the substrate layer 60. The air bag 14 (FIG. 2) moves outward through the deployment opening 72 upon being inflated into the vehicle occupant compartment 26.

The intermediate layer 62 of the deployment panel 40 extends fully across the deployment opening 72 in the substrate layer 60, and extends fully over the substrate layer 60 throughout the entire area of the deployment panel 40 bounded by the peripheral edge surface 46 (FIG. 3). The intermediate layer 62 may have any suitable composition known in the art, but has a compressible structure. As shown in FIG. 4, the compressible structure of the intermediate layer 62 preferably is a foam structure. The intermediate layer 62 thus provides the deployment panel 40 with a compressible feel to match a corresponding compressible feel of the instrument panel 28 at the outer side surface 54 (FIG. 3) of the instrument panel 28.

The cover layer 64 defines the outer side surface 52 (FIG. 3) of the deployment panel 40, and is a continuous piece of molded plastic material which may have any suitable composition known in the art.

The door foundation 66 in the preferred embodiment of the present invention is a continuous piece of thin sheet metal. However, the door foundation 66 could alternatively be formed of a plastic material, such as the plastic material of which the substrate layer 60 is formed. As viewed in FIG. 4, the door foundation 66 has an L-shaped cross-sectional configuration defined by a horizontally extending panel portion 80 and a vertically extending base portion 82. A hinge portion 84 of the door foundation 66 is defined by the material of the door foundation 66 at the juncture of the panel portion 80 and the base portion 82.

Figure 8:
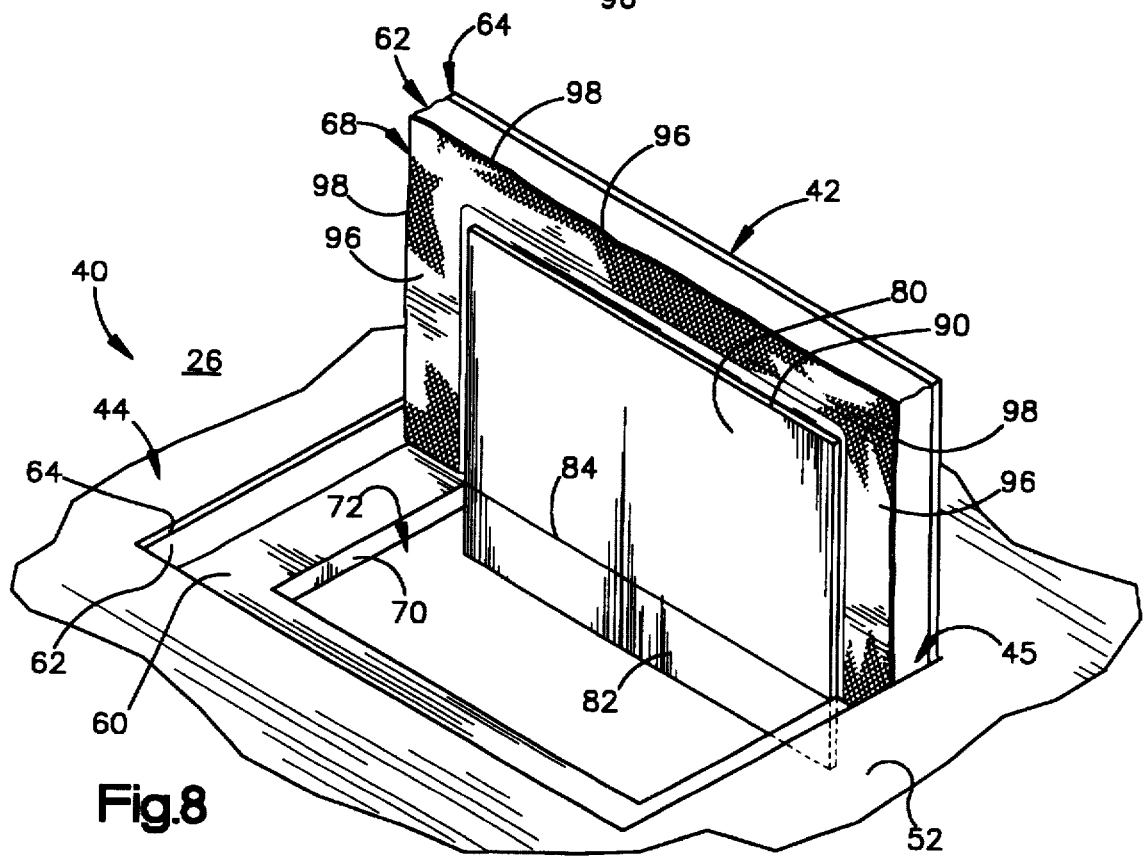
FIG. 8 is a view similar to FIG. 3 showing parts in different positions.

The base portion 82 of the door foundation 66 has a side surface 86 abutting the inner edge surface 70 of the substrate layer 60 along one side of the deployment opening 72. As shown in FIGS. 5 and 8, the base portion 82 and the hinge portion 84 of the door foundation 66 both extend along the full length of the deployment opening 72 at that side of the deployment opening 72. An adhesive bond 88 (FIG. 5) between the abutting surfaces 70 and 86 fixes the base portion 82 of the door foundation 66 to the substrate layer 60. Rather than projecting downward away from the substrate layer 60, as viewed in FIG. 4, the base portion 82 of the door foundation 66 could alternatively have a lower end flush with a lower side surface 89 of the substrate layer 60.

Figure 6:
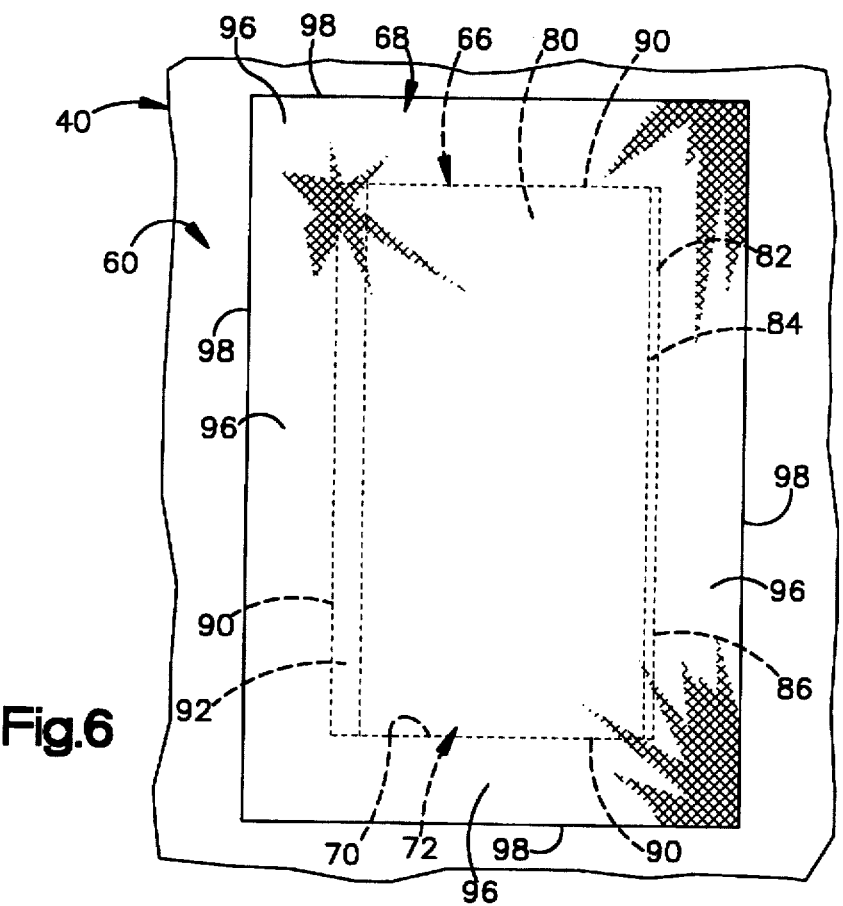
FIG. 6 is a view taken generally on line 6—6 of FIG. 4.

The panel portion 80 of the door foundation 66 has a rectangular peripheral shape with a length equal to the length of the base portion 82 and the hinge portion 84. Accordingly, a peripheral edge surface 90 of the door foundation 66 extends around three sides of the panel portion 80 between opposite ends of the base portion 82 and the hinge portion 84. As shown in FIGS. 4 and 6, the width of the panel portion 80 is substantially greater than the width of the deployment opening 72. The panel portion 80 of the door foundation 66 thus extends fully across the deployment opening 72, and further extends partially across the substrate layer 60 adjacent to the deployment opening 72. More specifically, a peripheral edge section 92 of the panel portion 80 is located opposite the base portion 82, and overlies the substrate layer 60 adjacent to the side of the deployment opening 72 that is opposite the base portion 82.

The scrim layer 68 of the deployment panel 40 has a woven structure defined by strands of metal, plastic, or fibers of any other suitable material known in the art. As shown in FIGS. 4, 5 and 6, the scrim layer 68 is located between the substrate layer 60 and the intermediate layer 62, and has a rectangular peripheral shape. The scrim layer 68 extends fully over the panel portion 80 of the door foundation 66, and is preferably fixed to the panel portion 80 by an adhesive bond 94 (FIGS. 4 and 5). The scrim layer 68 further extends partially over the substrate layer 60 around the periphery of the panel portion 80 of the door foundation 66. As best shown in FIG. 6, the scrim layer 68 thus has a rectangular, frame-shaped fringe 96 which fully surrounds the door foundation 66 and the deployment opening 72 in the substrate layer 60. The fringe 96 of the scrim layer 68 has a peripheral edge 98, and is fixed to the substrate layer 60 by another adhesive bond 100 (FIGS. 4 and 5).

When the air bag 14 (FIGS. 1 and 2) is being inflated, it moves upward, as viewed in FIGS. 4 and 5, through the deployment opening 72 in the substrate layer 60. The inflation fluid in the air bag 14 then causes the air bag 14 to apply a fluid pressure force to the panel portion 80 of the door foundation 66 where the panel portion 80 extends across the deployment opening 72. This induces shear stress across the thickness of the deployment panel 40.

The adhesive bond 100 between the scrim layer 68 and the substrate layer 60 is not strong enough to resist being broken by the shear stress induced in the deployment panel 40 by the inflating air bag 14. Therefore, as the inflating air bag 14 moves forcefully against the panel portion 80 of the door foundation 66, it lifts the panel portion 80 so as to cause the panel portion 80 to peel the fringe 96 of the scrim layer 68 away from the substrate layer 60. Such peeling occurs progressively across the fringe 96 in directions extending from the deployment opening 72 toward the peripheral edge 98 of the fringe 96.

Figure 7:
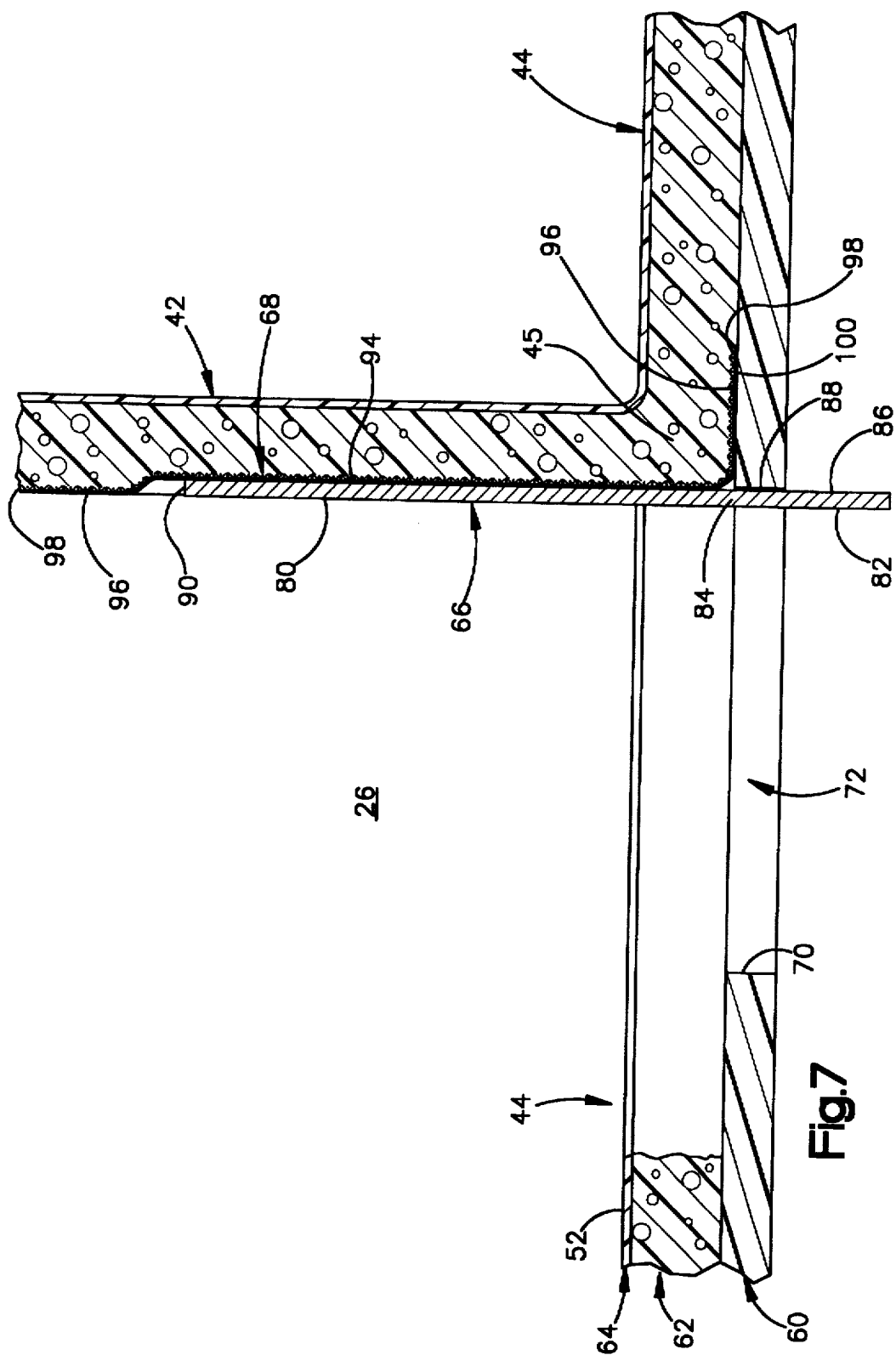
FIG. 7 is a view similar to FIG. 4 showing parts in different positions.

When the fringe 96 of the scrim layer 68 has been fully peeled away from the substrate layer 60, the shear stress induced by the inflating air bag 14 ruptures the deployment panel 40 across the thickness of the deployment panel 40 between the peripheral edge 98 of the scrim layer 68 and the outer surface 52 of the cover layer 64. The fringe 96 of the scrim layer 68, and the overlying portions of the intermediate layer 62 and the cover layer 64, are then lifted upward by the panel portion 80 of the door foundation 66 as the inflating air bag 14 moves the panel portion 80 pivotally about the hinge portion 84 toward the position shown in FIGS. 7 and 8. The deployment door 42 is thus moved pivotally about the hinge 45 from the closed position of FIG. 3 to the opened position of FIG. 8.

In accordance with a particular feature of the present invention, the peripheral edge 98 of the scrim layer 68 defines the location of a rupturable boundary 110 (FIGS. 3–6) between the deployment door 42 and the surrounding frame portion 44 of the deployment panel 40. The rupturable boundary 110 and the peripheral edge 98 of the scrim layer 68 extend coextensively around three sides of the deployment door 42 between opposite ends of the hinge 45. The rupturable boundary 110 extends along the peripheral edge 98 because the scrim layer 68 imparts greater shear strength to the portion of the deployment panel 40 that includes the scrim layer 68. The scrim layer 68 thus imparts a difference between the shear strengths of the deployment door 42 and the surrounding frame portion 44 of the deployment panel 40. This difference in shear strengths causes the deployment panel 40 to rupture in shear at the peripheral edge 98 of the scrim layer 68, i.e., along the boundary 110.

In accordance with the foregoing feature of the present invention, the peripheral shape of the deployment door 42 matches the peripheral shape of the scrim layer 68, rather than the peripheral shape of the deployment opening 72 or the door foundation 66. Since the peripheral shape of the scrim layer 68 can be varied easily without affecting the structures of the other parts of the deployment panel 40, the deployment door 42 can have any peripheral shape that is suitable for the particular instrument panel 28 or other vehicle part upon which the deployment panel 40 is mounted. For example, the deployment door 92 could have non-rectangular features, such as one or more rounded corners, with the shapes of the deployment opening 72 and the door foundation 66 being unchanged.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for use with an inflatable vehicle occupant protection device, said apparatus comprising:

a trim panel for covering the inflatable device in a vehicle, said trim panel having layers including a scrim layer;

said scrim layer having an edge defining a boundary between first and second portions of said trim panel which have first and second shear strengths, respectively, said scrim layer imparting a difference between said shear strengths such that said trim panel is rupturable along said edge under the influence of the inflatable device as a result of said difference between shear strengths.

2. Apparatus for use with an inflatable vehicle occupant protection device, said apparatus comprising:

deployment panel means for covering the inflatable device in a vehicle, said deployment panel means having layers including a substrate layer, a compressible layer, and a scrim layer;

said substrate layer having an inner edge defining a deployment opening through which the inflatable device is movable when being inflated;

said compressible layer extending fully across and around said deployment opening and said scrim layer;

said scrim layer extending at least partially across said deployment opening and further extending partially across said substrate layer adjacent to said deployment opening, said scrim layer having a fringe releasably adhered to said substrate layer so as to be peeled away from said substrate layer under the influence of the inflatable device upon movement of the inflatable device through said deployment opening.

3. Apparatus as defined in claim 2 wherein said deployment panel means further includes a door foundation having a hinge portion and an edge portion opposite said hinge portion, said hinge portion of said door foundation being fixed to said substrate layer, said edge portion of said door foundation overlying said substrate layer between said deployment opening and said fringe.

4. Apparatus as defined in claim 2 wherein said scrim layer has a edge defining a boundary between a first portion of said deployment panel means which includes said scrim layer and a second portion of said deployment panel means which surrounds said scrim layer, said first and second portions of said deployment panel means respectively having first and second shear strengths, said scrim layer imparting a difference between said shear strengths such that said deployment panel means is rupturable along said boundary under the influence of the inflatable device upon movement of the inflatable device through said deployment opening.

5. Apparatus for use with an inflatable vehicle occupant protection device, said apparatus comprising:

trim means for covering the inflatable device in a vehicle, said trim means having layers including a scrim layer;

said scrim layer having an edge defining a boundary between first and second portions of said trim means which have first and second shear strengths, respectively, said scrim layer imparting a difference between said shear strengths such that said trim means is rupturable along said boundary under the influence of the inflatable device as a result of said difference between said shear strengths;

said layers of said trim means further including a non-rupturable substrate layer with a deployment opening through which the inflatable device is movable when being inflated, said scrim layer extending at least partially across said deployment opening and further extending partially across said substrate layer adjacent to said deployment opening, said scrim layer being releasably adhered to said substrate layer so as to be peeled away from said substrate layer under the influence of the inflatable device upon movement of the inflatable device through said deployment opening.

6. Apparatus for use with an inflatable vehicle occupant protection device, said apparatus comprising:

trim means for covering the inflatable device in a vehicle, said trim means having layers including a scrim layer;

said scrim layer having an edge defining a boundary between first and second portions of said trim means which have first and second shear strengths, respectively, said scrim layer imparting a difference between said shear strengths such that said trim means is rupturable along said boundary under the influence of the inflatable device as a result of said difference between said shear strengths;

said first portion of said trim means defining a pivotal deployment door and a hinge extending along a side of said deployment door, said edge of said scrim layer extending around said deployment door and between opposite ends of said hinge so as to define said boundary as a rupturable peripheral boundary of said deployment door;

said deployment door including a nonrupturable door foundation, said scrim layer overlying said door foundation and having a fringe extending partially across said deployment door from said door foundation to said rupturable peripheral boundary of said deployment door;

said layers of said trim means further including a non-rupturable substrate layer with a deployment opening through which the inflatable device is movable forcefully against said door foundation, said fringe being releasably adhered to said substrate layer so as to be peeled away from said substrate layer under the influence of the inflatable device upon movement of the inflatable device through said deployment opening.

7. Apparatus as defined in claim 6 wherein said door foundation has a peripheral edge section which overlies said substrate layer between said deployment opening and said fringe.

* * * * *